US010728380B2

(12) United States Patent
Soni et al.

(10) Patent No.: US 10,728,380 B2
(45) Date of Patent: Jul. 28, 2020

(54) METHOD AND ELECTRONIC DEVICE FOR AUTOMATICALLY MANAGING EVENTS BASED ON TIME-ZONE DIFFERENCE

(71) Applicant: Samsung Electronics Co., Ltd., Suwon-si, Gyeonggi-do (KR)

(72) Inventors: Amit Kumar Soni, Bangalore (IN); Debayan Mukherjee, Bangalore (IN); Sherene Kuruvilla, Bangalore (IN); Amitoj Singh, Gurugram (IN); Vishnupriya Surendranath Kaulgud, Bangalore (IN); Kiran Prasanth Rajan, Bangalore (IN); Veethika Mishra, Bangalore (IN); Ridhi Chugh, Gurugram (IN); Shazia Jamal, Gurugram (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/885,180

(22) Filed: Jan. 31, 2018

(65) Prior Publication Data

US 2019/0238675 A1     Aug. 1, 2019

(30) Foreign Application Priority Data

Jan. 31, 2017 (IN) .............................. 201741003592
Jan. 29, 2018 (IN) .............................. 201741003592

(51) Int. Cl.
*H04M 1/725* (2006.01)
*G06F 3/0481* (2013.01)
(Continued)

(52) U.S. Cl.
CPC ........ *H04M 1/72572* (2013.01); *G06F 1/163* (2013.01); *G06F 3/0488* (2013.01);
(Continued)

(58) Field of Classification Search
CPC ............. G06Q 10/109; G06Q 10/1095; G06Q 10/1093; G06Q 10/06; G06Q 10/063118;
(Continued)

(56) References Cited

U.S. PATENT DOCUMENTS

| 7,711,855 B2 | 5/2010 | Thind et al. |
| 2003/0052915 A1* | 3/2003 | Brown ................. G06Q 10/109 715/752 |

(Continued)

FOREIGN PATENT DOCUMENTS

| EP | 3 101 882 A2 | 12/2016 |
| JP | 2015-118033 A | 6/2015 |

(Continued)

OTHER PUBLICATIONS

European Search Report dated Nov. 5, 2019; European Appln. No. 18747762.5-1221 / 3552378 PCT/KR2018001348.

*Primary Examiner* — Daniel Lai
(74) *Attorney, Agent, or Firm* — Jefferson IP Law, LLP

(57) ABSTRACT

A method for automatically managing events based on time-zone difference is provided. The proposed method includes identifying at least one event associated with at least one of a secondary electronic device or the primary electronic device, wherein the at least one event is associated with a first time interval. Further, the proposed method includes identifying a second time interval associated with at least one of the primary electronic device or the secondary electronic device. Further, the proposed method includes determining a time-zone difference between the first time interval and the second time interval based on at least one time-zone parameter associated with the first time interval and the second time interval. Furthermore, the proposed method includes updating a time interval of the at least one event based on the time-zone difference.

18 Claims, 20 Drawing Sheets

(51) Int. Cl.
  *G06F 3/0488* (2013.01)
  *G06F 1/16* (2006.01)
  *G06F 3/0484* (2013.01)
  *H04W 4/02* (2018.01)

(52) U.S. Cl.
  CPC ...... *G06F 3/04817* (2013.01); *G06F 3/04847* (2013.01); *G06F 3/04883* (2013.01); *H04M 1/72566* (2013.01); *H04M 1/72569* (2013.01); *H04W 4/02* (2013.01)

(58) Field of Classification Search
  CPC ........ G06Q 10/06314; H04M 1/72566; H04M 1/72572; H04M 2250/10; H04M 1/72569; H04W 4/02; H04W 4/021; H04W 4/023; H04W 4/04; H04W 64/00; H04W 4/025; H04W 4/21; G06F 16/2477; G06F 16/29
  See application file for complete search history.

(56) References Cited

U.S. PATENT DOCUMENTS

| | | | | |
|---|---|---|---|---|
| 2006/0002236 A1* | 1/2006 | Punkka | ................ | G04G 9/0076 368/21 |
| 2006/0212330 A1* | 9/2006 | Savilampi | ............ | G06Q 10/109 705/7.19 |
| 2008/0299960 A1* | 12/2008 | Lockhart | .............. | G06Q 10/109 455/418 |
| 2009/0077570 A1* | 3/2009 | Oral | ..................... | G06Q 10/109 719/318 |
| 2009/0168609 A1* | 7/2009 | Weir | .................... | G06Q 10/109 368/21 |
| 2011/0076942 A1 | 3/2011 | Taveau et al. | | |
| 2012/0233563 A1* | 9/2012 | Chakra | .............. | G06Q 10/1093 715/772 |
| 2013/0106987 A1 | 5/2013 | Wang et al. | | |
| 2013/0315041 A1* | 11/2013 | Hiremath | ................ | G06Q 10/10 368/10 |
| 2014/0188541 A1* | 7/2014 | Goldsmith | ............. | G06Q 10/06 705/7.19 |
| 2014/0347289 A1* | 11/2014 | Suh | ......................... | G06F 3/017 345/173 |
| 2015/0199077 A1* | 7/2015 | Zuger | ................... | G06Q 10/109 715/764 |
| 2015/0261947 A1* | 9/2015 | Motoe | ..................... | G06F 21/35 726/19 |
| 2015/0268839 A1 | 9/2015 | Tallett | | |
| 2015/0294273 A1 | 10/2015 | Barraci et al. | | |
| 2015/0347983 A1* | 12/2015 | Jon | .................... | G06Q 10/1095 705/7.19 |
| 2016/0054892 A1 | 2/2016 | Kim et al. | | |
| 2016/0148166 A1 | 5/2016 | Kim et al. | | |
| 2016/0363911 A1 | 12/2016 | Belitsky et al. | | |
| 2017/0024702 A1* | 1/2017 | Agrawal | ........... | G06Q 10/1093 |

FOREIGN PATENT DOCUMENTS

| | | |
|---|---|---|
| KR | 10-2016-0023232 A | 3/2016 |
| KR | 10-2016-0042424 A | 4/2016 |
| WO | 2006/114386 A1 | 11/2006 |
| WO | 2016/012835 A1 | 1/2016 |
| WO | 2016/175411 A1 | 11/2016 |
| WO | 2017/200823 A1 | 11/2017 |

* cited by examiner

FIG. 2A
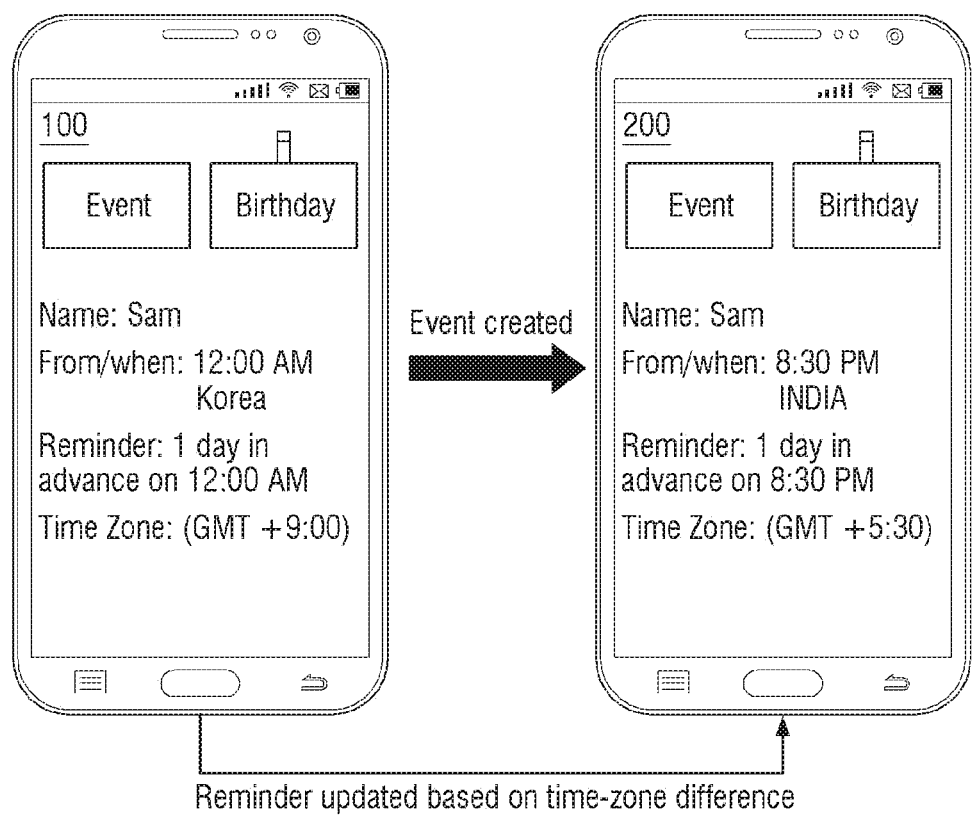
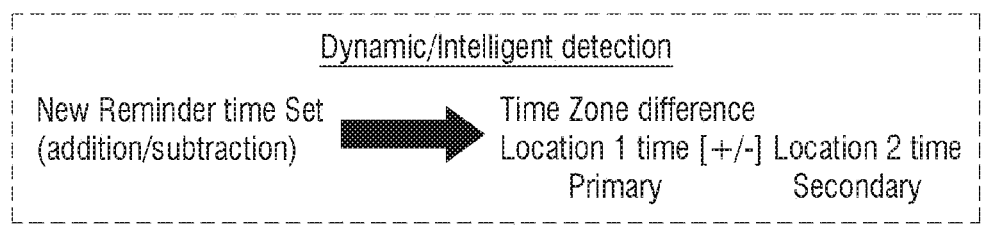

FIG. 9
Set your free time
using bezel
interaction
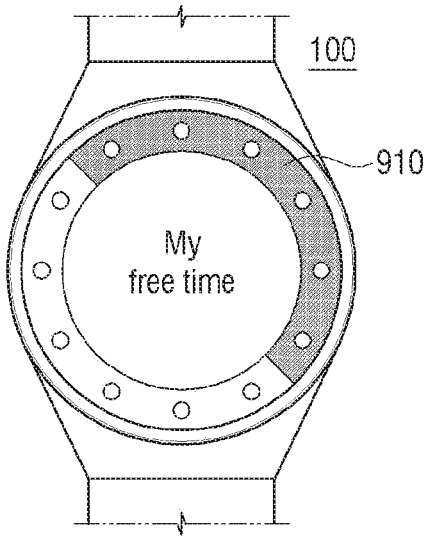
Primary device free time
Bound devices (Secondary devices) will get
a notification about his free time on that time zone
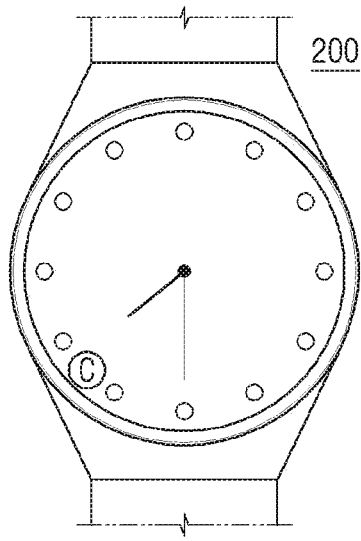
Get notification of free
Time of primary device based
On his time zone
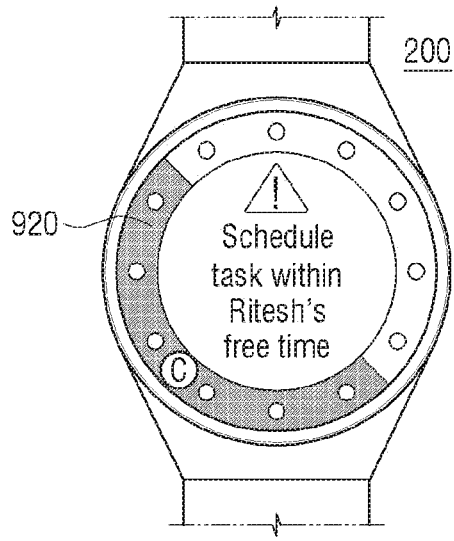
Schedule a task accordingly
Based on primary device time zone

FIG. 12

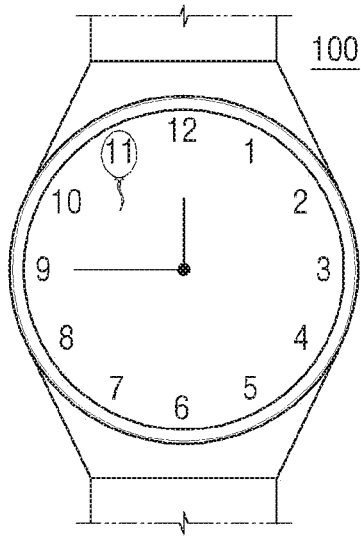
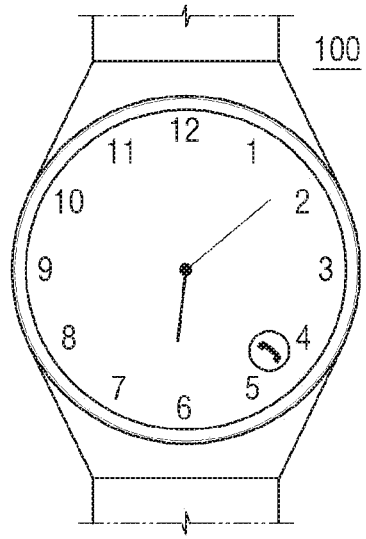

Event reminders created on watch display
based on predefined icons like for celebration :
"balloon" or for call : "call icon"

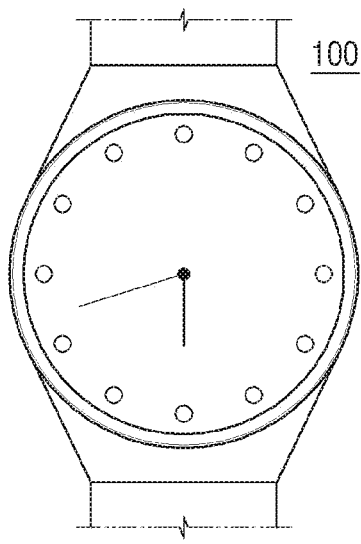
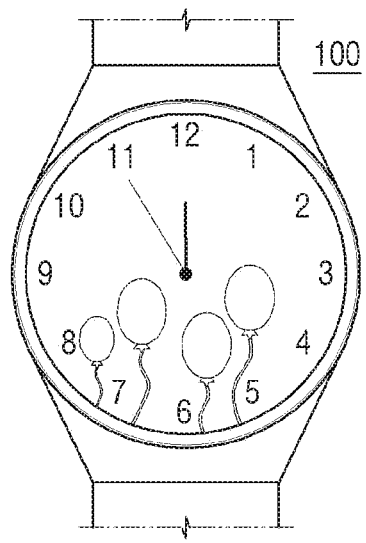

Event reminder in the form of
glowing circular ring on the
watch display pointing towards
the reminder timing The display effect will appear
on the watch, when the reminder
time happened like Birthday
reminder time Show the balloon
flying effect on the watch

FIG. 13
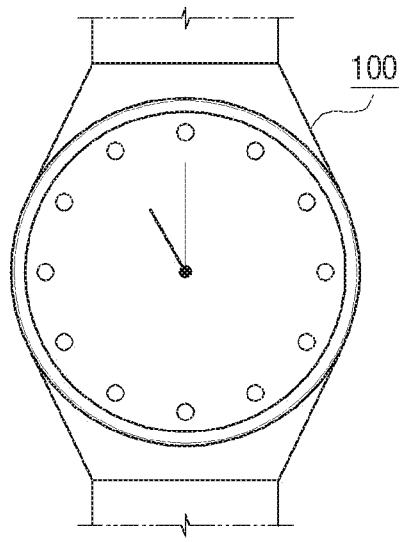
Watch display
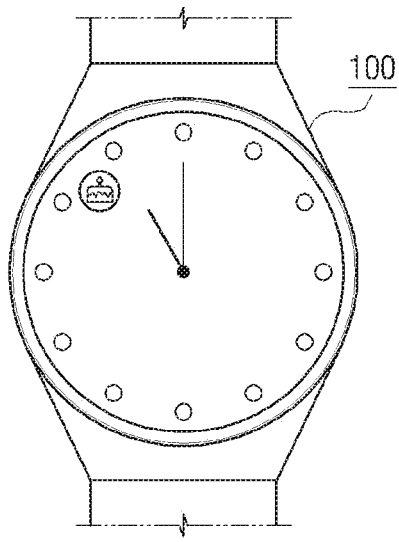
Event reminder appear on the
watch, select the reminder and
start rotating the bezel to see
other to-do items
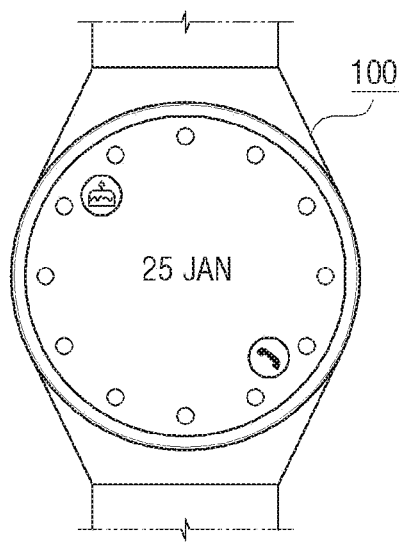
The next to-do reminder will be
shown on the watch display
at its particular time,
rotate more to revel more to-do tasks
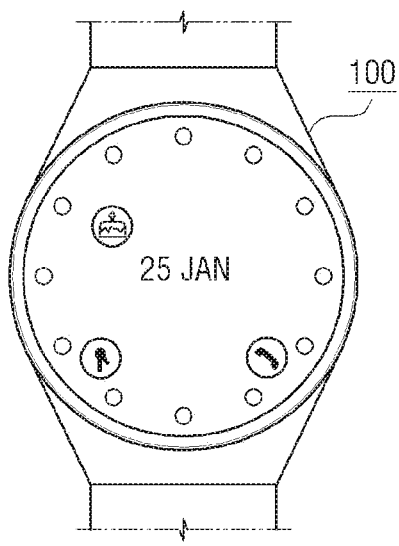
After each rotation, user
will get to know the
upcoming reminder list
based on a time zone he is present

METHOD AND ELECTRONIC DEVICE FOR AUTOMATICALLY MANAGING EVENTS BASED ON TIME-ZONE DIFFERENCE

CROSS-REFERENCE TO RELATED APPLICATION(S)

This application is based on and claims priority under 35 U.S.C. § 119(a) of an Indian patent application number 201741003592, filed on Jan. 31, 2017, in the Indian Intellectual Property Office and of an Indian patent application number 201741003592, filed on Jan. 29, 2018, in the Indian Intellectual Property Office, the disclosure of each of which is incorporated by reference herein in its entirety.

TECHNICAL FIELD

The disclosure relates to an electronic device providing a user with additional functions such as a schedule management function, a memo function, and the like. More particularly, the disclosure relates to a user setting a schedule (i.e. a schedule item or event) according to a standard time zone of a place where the user is located through a schedule management function.

BACKGROUND

In general, time is the basic unit which helps people sync with others around the world. People live and work in different time zones. They consequently face problems with syncing their times and have to put in extra effort to get on the same page for meetings, conferences, birthday reminders and so on. People also find it difficult to remember all their day-to-day activities and to respond to them at specific times, if their time zones change frequently.

For example, when the electronic device is enabled to process a calendar database transported to a time zone that is different from a time zone where it is usually located, resources at the electronic device are often used inefficiently to process event data (e.g., meeting data and reminder data associated with time-based events) that is not relevant to its current location.

Meanwhile, the user may move to another area or country from the current location for an overseas business trip or travel. In this case, the electronic device displays a different standard time zone depending on the area or country before the movement or after the movement. That is, the standard time zone may change as a standard meridian used in the area or country before or after the movement changes.

Accordingly, when the user presets a schedule in another area or country, the user may input a place and a standard time zone according to the place in order to set the schedule based on the standard time zone of the corresponding place. There exists no mechanism by which the reminders of the schedule can be effectively and automatically managed based on the change in time zone of the user of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for managing events based on time-zone difference.

Another aspect of the disclosure is to manage reminders of an existing events and/or reminders of an upcoming events based on a time-zone difference between the secondary devices/linked electronic devices and a primary electronic device.

Yet another aspect of the disclosure is to provide a method which can be used by the electronic device and/or the electronic device configured to display a time/time-zone difference feature in the reminder list/events which are linked/bound with the connected devices.

Still another aspect of the disclosure is to provide a method by which the electronic device displays about the upcoming event(s)/activity based on the current time zone and accordingly sync the reminders thereof.

Yet another object of the disclosure is to provide a smart reminder interaction and visualization on electronic devices based on time zone.

Still another aspect of the disclosure is to provide a method for automatically managing events based on time-zone difference.

In accordance with an aspect of the disclosure, a method is provided. The method includes identifying, by a primary electronic device, at least one event associated with at least one of a secondary electronic device or the primary electronic device, wherein the at least one event is associated with a first time interval. Further, the proposed method includes identifying, by the primary electronic device, a second time interval associated with at least one of the at least one secondary electronic device or the primary electronic device. Further, the proposed method includes determining, by the primary electronic device, a time-zone difference between the first time interval and the second time interval based on at least one time-zone parameter associated with the first time interval and the second time interval. Furthermore, the proposed method updating, by the primary electronic device, a time interval of the at least one event based on the time-zone difference.

In an embodiment, the method further includes updating, by the primary electronic device, at least one reminder of the at least one event based on the updated time interval.

In an embodiment, where the identifying of the second time interval associated with the least one secondary electronic device and the primary electronic device comprises receiving information indicative of a change in time-zone from the first time interval to the second time interval.

In an embodiment, the method further comprises managing, by the primary electronic device, the at least one event based on the updated time interval.

In an embodiment, where the at least one time-zone parameter comprises a mobile country code, a Greenwich Mean Time (GMT) offset, a daylight savings time parameter, or geo-location parameters comprising a global positioning system identifier.

In an embodiment, where the managing of the at least one event based on the updated time interval comprises displaying an indication about the at least one event in accordance with the updated time interval on a display screen of the at least one of the primary electronic device or the at least one secondary electronic device.

In an embodiment, where the indication is a graphical element indicating a type of the at least one event.

In an embodiment, where the managing of the at least one event based on the updated time interval comprises identifying a third time interval based on the updated time interval, where the third time interval indicates the availability of time, and transmitting an indication indicating the third time interval to the secondary electronic device.

In an embodiment, where the primary electronic device can be a mobile device and the at least one secondary electronic device can be one of the mobile device and a wearable device.

In an embodiment, where the primary electronic device is synchronized with the at least one secondary electronic device.

In an embodiment, where the event comprises meetings, conferences, birthday reminders, and day-to-day activities.

In an embodiment, where automatically managing the at least one event based on the updated time interval comprises determining a conflict among two or more events based on the updated time interval, and automatically performing one of generating a notification to select the at least one event from the two or more events, or selecting the at least one event from the two or more events based on priority of the at least one event from the two or more events.

In accordance with another aspect of the disclosure, an electronic device is provided. The electronic device includes a communication circuit, a memory configured to store instructions, and a processor operatively coupled with the communication circuit and the memory. The least one processor, when executing the instructions, is configured to identify at least one event associated with at least one of the electronic device and or another electronic device, where the at least one event is associated with a first time interval, identify a second time interval associated with the least one of the electronic device and the other electronic device, determine a time-zone difference between the first time interval and the second time interval based on at least one time-zone parameter associated with the first time interval and the second time interval, and updated a time interval of the at least one event based on the time-zone difference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A, 2B, and 2C are example scenarios in which the time-interval of an event associated with the primary electronic device and the secondary electronic device is updated based on the time-zone difference, according to an embodiment of the disclosure;

FIG. 9 is an example illustration in which the user can set a range of time to be a time period for no activity/free time on the primary electronic device, according to an embodiment of the disclosure;

FIG. 12 is an example illustration in which the primary electronic device displays a graphical element indicating the type of event, according to various embodiments of the disclosure;

FIG. 13 is an example illustration in which bezel interaction is detected for displaying to-do-tasks, according to various embodiments of the disclosure;

Throughout the drawings, it should be noted that like reference numbers are used to depict the same or similar elements, features, and structures.

DETAILED DESCRIPTION

Figure 1:
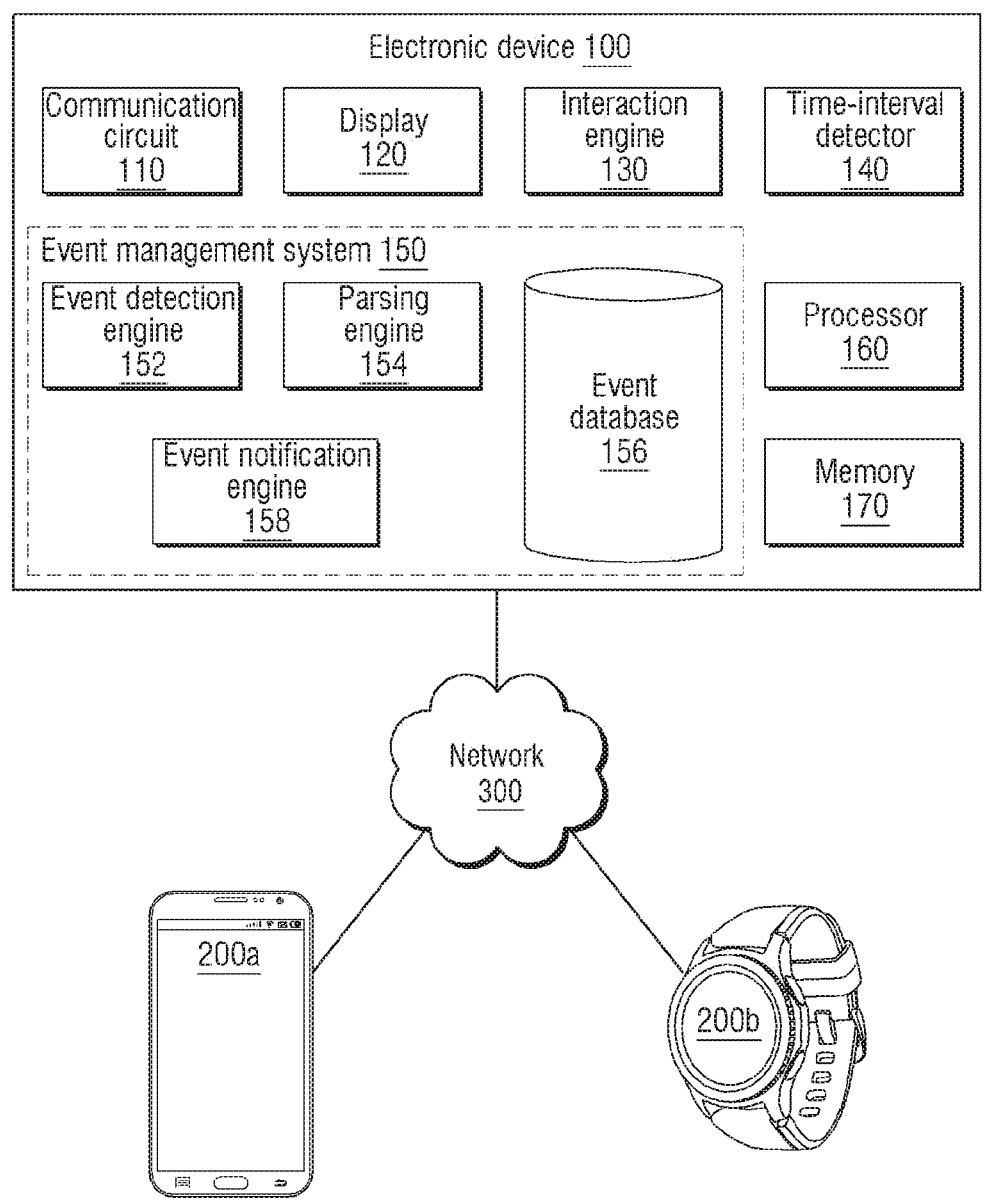
FIG. 1 illustrates an overview of a system in which the primary electronic device communicates with the at least one secondary electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the various embodiments may be physically separated into two or more interacting and discrete blocks without departing from the scope of the disclosure. Likewise, the blocks of the various embodiments may be physically combined into more complex blocks without departing from the scope of the disclosure.

Accordingly, various embodiments herein provide a method for automatically managing events based on time-zone difference. The proposed method includes detecting at least one event associated with at least one of a secondary electronic device or the primary electronic device, wherein the at least one event is associated with a first time interval. Further, the proposed method includes detecting a second time interval associated with at least one of the at least one secondary electronic device or the primary electronic device. Further, the proposed method includes determining a time-zone difference between the first time interval and the second time interval based on at least one time-zone parameter associated with the first time interval and the second time interval. Furthermore, the proposed method includes dynamically detecting a time interval of the at least one event based on the time-zone difference.

The term primary electronic device and electronic device herein can be used interchangeably. Further, the term secondary electronic device and another electronic device can be used interchangeably.

Both the primary electronic device and the secondary electronic device are always synced with each and hence the event created in any of the primary electronic device and the secondary electronic device are bound events.

Embodiments herein provide a method for automatically detecting time-zone(s) of the secondary electronic device(s) with respect to the primary electronic device(s) and syncing of the reminders associated therewith based on the time-zones associated thereof.

Unlike to methods and systems of the related art, the proposed method can be used to automatically update and/or filter reminders of the event associated with the primary electronic and/or reminders of the events associated with the secondary electronic device based on the time-zone difference there between. For example, if the primary electronic device located at time-zone "A" creates an event for the secondary electronic device located at time-zone "B", then by virtue of the proposed method, a time interval of the event created at the secondary electronic device would be the time-zone difference between the time-zone "A" and the time-zone "B". Further, the reminders of the event are independently notified to the each of the primary electronic device and the secondary electronic device based on their local time-zone.

Unlike to methods and systems of the related art, the proposed method executed on the electronic device and/or electronic device can be used to display a graphical indication indicating: the type of upcoming event, notification regarding the events, availability of time to create any event, and the like.

Referring now to the drawings and more particularly to FIGS. 1, 2A to 2C, 3 to 7, 8A and 8B, 9 to 13, 14A and 14B, and 15, where similar reference characters denote corresponding features consistently throughout the figure, there are shown preferred embodiments.

FIG. 1 illustrates an overview of a system in which the primary electronic device 100 communicates with the at least one secondary electronic device 200a-200b, according to an embodiment of the disclosure.

Referring to FIG. 1, the primary electronic device 100 and at the at least one secondary electronic device 200a-200b (hereinafter "200") can be, for example, a smartphones, a mobile phone, a laptop, a desktop, a personal digital assistant (PDA), a wearable device such as, for example, a smart watch, a smart bracelet, a smart glass, or the like, bendable displays, dual screen mobile devices, edge-to-edge displays etc. The primary electronic device 100 and at the at least one secondary electronic device 200 can also be internet of things (IoT) devices such as, e.g., mobile devices, sensor, smart appliances such as refrigerators, television (TV), air conditioner (AC), toasters, ovens, microwaves, grills, rice cookers, juicers, freezers, dishwashers, dishes, hand tools, clothes washers, clothes dryers, water heaters, furnaces, ACs, thermostats, light, vacuum cleaners, sprinklers, etc. Other forms of the electronic devices are within the scope of the various embodiments discussed herein.

In an embodiment, the primary electronic device 100 includes, for example, a communication circuit 110, a display 120, an interaction engine 130, a time-interval detector 140, an event management system 150, a processor 160, and a memory 170.

In an embodiment, the primary electronic device 100 includes a communication circuit 110 enabled to communicate with the secondary electronic device 200 through a network 300. The network 300 can be, for example, a remote communication network, a cloud based network, or the like, configured to allow synchronizing operations between the primary electronic device 100 and the secondary electronic device 200. The primary electronic device 100 and the secondary electronic deice 200 can include multiple options to enable/disable features associated with synchronizing (i.e., sync, syncing) set of applications associated (or, installed therein) therewith. For example, the user of the primary electronic device 100 can provide one or more options to enable/disable the syncing of a calendar application, reminders, events, or the like with the secondary electronic device 200.

A display 120 (e.g., liquid crystal displays (LCDs)), active-matrix organic light emitting diode (AMOLED), light emitting diode (LED), organic light emitting diode (OLED) and other forms of display which are known and/or yet to be known in the art., configured to have display data output from the processor 160 rendered thereon. The display 120 can be configured to display graphical elements such as text, pictures or the like.

For example, once the syncing of the calendar application, reminder is enabled at the primary electronic device 100, all information such as for example, event information, reminder, etc., pertaining to the calendar application is synced with the secondary electronic device 200. The display 120 can represent such information on a display screen of the primary electronic device 100, and a display screen of the secondary electronic device 200.

The display 120 may be affiliated/supported with an interaction engine 130 such as for example, sensors such as touch based, voice based, etc., configured to detect an input from the user of the primary electronic device 100/the secondary electronic device 200 to create such events. For example, the interaction engine 130 can be a keypad (not shown). In another example, with the primary electronic device 100 being a wearable device, the interaction engine 130 can be a dial or a touch screen with bezels.

In an embodiment, the time-interval detector 140 can be configured to detect and record time information of the primary electronic device 100. The time information can be a current local time of the primary electronic device 100 and the current local time of the secondary electronic device 200, as the syncing operation is enabled there between. Further, the time information can be a time-zone differential between the primary electronic device 100 and the secondary electronic device 200. This time information may thereby be used as an indicator to update and/or filter the events (or, reminders associated with the events). Thus, based on the time information appropriate actions such as for example, inform, guide, alert and/or notify the primary electronic device 100 and the secondary electronic device 200 about the current local time (or time-zone differential).

In an embodiment, the time-interval detector 140 can be configured to communicate with location tracking sensors such as for example, GPS to obtain the time information. In another embodiment, the time information can be obtained from, for example, a geographically correlating the IP address number of an e-mail address/contact number (which contains country/regional/city domain information) with a global location) of the secondary electronic device 200. The time information can be obtained from the plurality of time-interval parameters such as for example, a mobile country code, a Greenwich Mean Time (GMT) offset, a daylight savings time parameter, and geo-location parameters comprising a global positioning system identifier. Further, daylight saving time (DST) can also be considered in some countries.

For example, the time-interval detector 140 can be configured to monitor the time (or, location with relation of change in current time) associated with a clock of the primary electronic device 100. In response to detecting the change in time-interval based on change detected in any one of the aforementioned time-interval parameters, the time-interval detector 140 can therefore communicate with the event management system 150.

The event management system 150 includes, for example, an event detection engine 152, a parsing engine 154, an event database 156, and an event notification engine 158. The event management system 150 can be operably coupled with the time-interval detector 140 and therefore communicates the instructions there between. As the name suggests, the event management system 150 is responsible for managing activities related to the events. The activities such as for example, reminders of the events, scheduling meetings, planning day-to-day activities, or the like. Further, the event management system can be configured to create the graphical elements indicating the type of events to be displayed at a scheduled time. For example, if a birthday event is created and set the reminder at 8:00 PM, then the event management system 150 can create graphical elements (animated balloon icons, birthday clipart, etc.) indicating the birthday event and display the graphical element on the display 120. Further, uses cases of the proposed embodiments are detailed in FIGS. 6, 7, 8A and 8B, 9 to 13, 14A and 14B, and 15.

In an embodiment, the event detection engine 152 can be configured to detect the events created by the user of the primary electronic device 100. Further, the event detection engine 152 is also responsible for detecting the events linked with the secondary electronic device 200. Example of events can be the birthday event, conference event, day-to-day events, call event, etc. All such events are therefore shared events, the events are linked with the secondary electronic device 200.

Figure 2B:
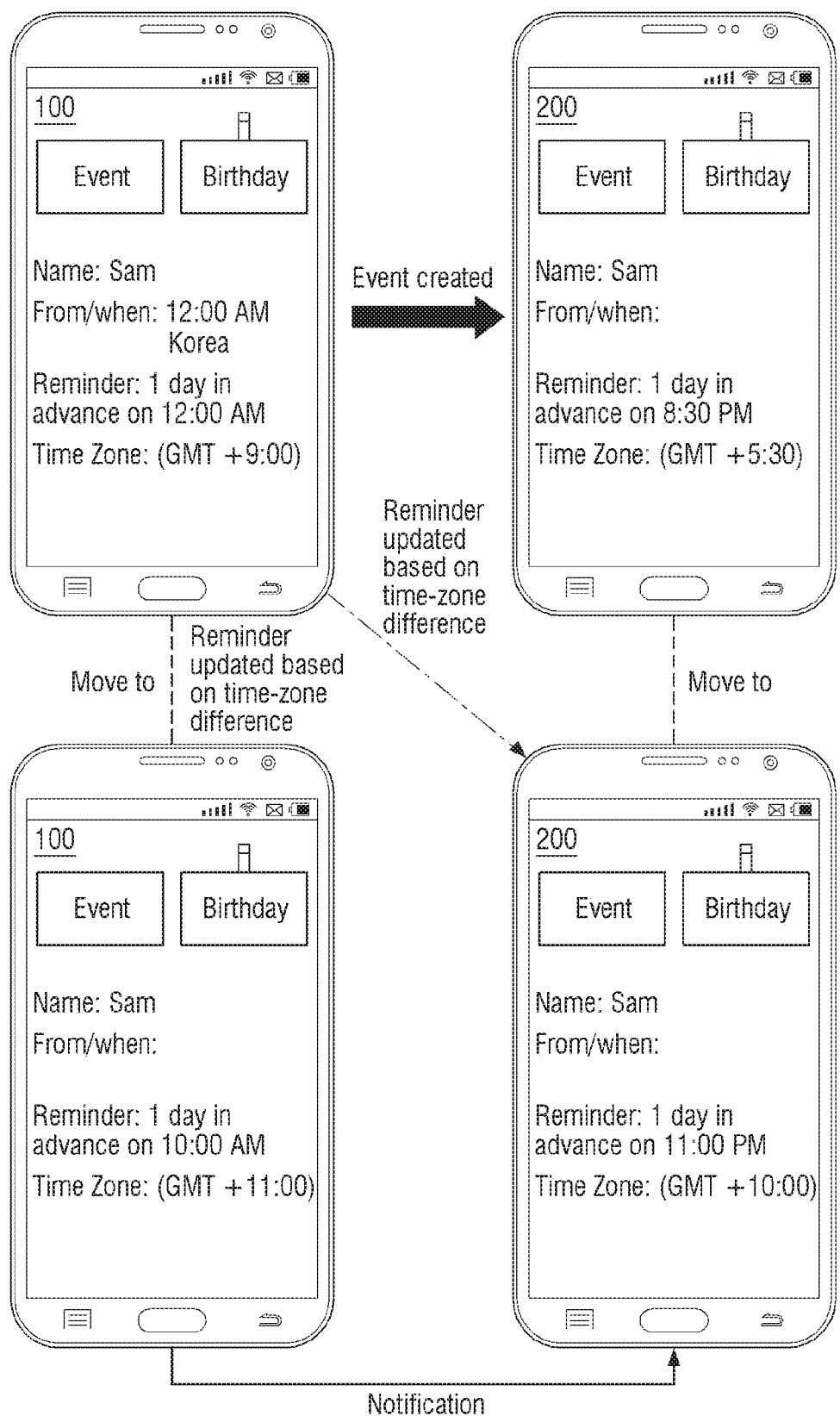

Unlike to methods and systems of the related art, the proposed method can be used to automatically update/notify the users of the primary electronic device 100/the secondary electronic device 200 about the changes, real-time, in the respective schedules of the user(s) due to change in time-zone (explained with an illustration in FIGS. 2A and 2B).

In an embodiment, the event detection engine 152 may be operably coupled with the parsing engine 154. The parsing engine 154 can be configured to parse the information of the event detected by the event detection engine 152. The parsed information may include, for example, details of the event such as, for example, name of the event, type of the event, scheduled time of the event, reminder set for the event, repetition set for the particular reminder, account related information of the user, the time-interval at which the event is created/reminder for the event is created, etc. In an embodiment, the parsing engine 154 can be configured to parse the applications to identify one or more reminders associated therewith.

For example, at first, the event management system 150 can be configured to compare the associated events (e.g. meeting, birthday, etc.) with the primary electronic device 100/secondary electronic device 200 and respective time zones (using meta data where event was created and where it is right now) of the primary electronic device 100/secondary electronic device 200. Further, the event management system 150 can be configured to utilize the information (example, GPS, calendar events, or the like) sync through the secondary electronic device 200 device account or device profile, events set before that event and then converts all the events in new time zone (updated time-interval). The updated information of the events in the new time-zone is communicated across all the linked secondary electronic device 200.

In an embodiment, the event detection engine 152 and the parsing engine 154 may be operably coupled with the event database 156. The parsed information can be communicated with the event database 156. The event database 156 can be configured to maintain the parsed information according to the proposed method. The event database 156 may include a number of rows and columns configured to store the parsed information. The searching and sorting for a relevant parsed information can be based on relevancy of the plurality of time-zone parameters. In another embodiment, the event database 156 can also be located in a server and can be remotely accessed by the primary electronic device 100 through the network 300.

In response to receiving the inputs from the time-interval detector 140, the event detection engine 152 and the parsing engine 154, the event management system 150 can be configured to query the event database 156. For example, if the primary electronic device 100, located at first time interval, while creating the event for the secondary electronic device 200 determines that the secondary electronic device is associated with the second time interval, then the event management system 150 can be configured to update the parsed information of the event stored in the event database 156 based on the determined time-zone difference between the first time interval and the second time interval.

In another example, if the primary electronic device 100 (located at the first time interval) creates the event for the secondary electronic device 200, thereafter, moves to different location associated with the second time interval then the event management system 150 can be configured to update the parsed information of the event stored in the event database 156 based on the determined time-zone difference between the first time interval and the second time interval. Further, the updated parsed information at the primary electronic device 100 are communicated to the secondary electronic device 200. In an embodiment, the event notification engine 158 can be configured to communicate the updated parsed information to the secondary electronic device 200.

The first time interval and the second time interval can be at least one time-interval parameter from the plurality of time-interval parameters. The first time interval of the event can be obtained by the parsing engine 154 i.e., parsing the calendar application, reminders configured for the event at particular day and at a particular time associated with a current location of the primary electronic device 100.

Further, the primary electronic device 100 can include a conflict detection engine (not shown) configured to determine a conflict among two or more events based on the updated time interval. For example, when the time-zone gets updated and in the case the electronic device 100 detects a conflicting meeting scheduled at the updated time-zone, then the conflict detection engine can be configured to resolve the conflict by providing a notification regarding the conflict to the user. Further, in another embodiment, the conflict detection engine can be configured to automatically select the at least one event from the two or more events based on priority associated with the at least one event from the two or more events. For example, the priority can be pre-defined by the user, determined based on information retrieved from browsed history of the user, relation of the user with contacts (in case of birthday events, meetings, etc.,), or the like.

The processor 160 (e.g., central processing unit (CPU), graphics processing unit (GPU), hardware chipset, etc.) communicatively coupled to the memory 170. The processor 160 may include a plurality of processors.

The memory 170 may include non-volatile storage elements. Examples of such non-volatile storage elements may include magnetic hard disc, optical discs, floppy discs, flash memories, or forms of electrically programmable read only memory (EPROM) or electrically erasable and programmable ROM (EEPROM) memories. In addition, the memory 170 may, in some examples, be considered a non-transitory storage medium. The term "non-transitory" may indicate that the storage medium is not embodied in a carrier wave or a propagated signal. However, the term "non-transitory" should not be interpreted that the memory 170 is non-movable. In some examples, the memory 170 can be configured to store larger amounts of information than a memory. In certain examples, a non-transitory storage medium may store data that can, over time, change (e.g., in random access memory (RAM) or cache).

For example, the electronic device 200 can include similar/identical hardware components (including associated functionalities thereof) to that of the electronic device 100.

Meanwhile, some or all of functions performed by the interaction engine 130, the time-interval detector 140, the event management system 150 may be performed by the processor 160 executing instructions stored in the memory 170. In addition, the electronic device 100 may be configured such that the processor 160 executing instructions stored in the memory 170 includes at least one of the interaction engine 130, the time-interval detector 140, or the event management system 150.

Figure 2C:
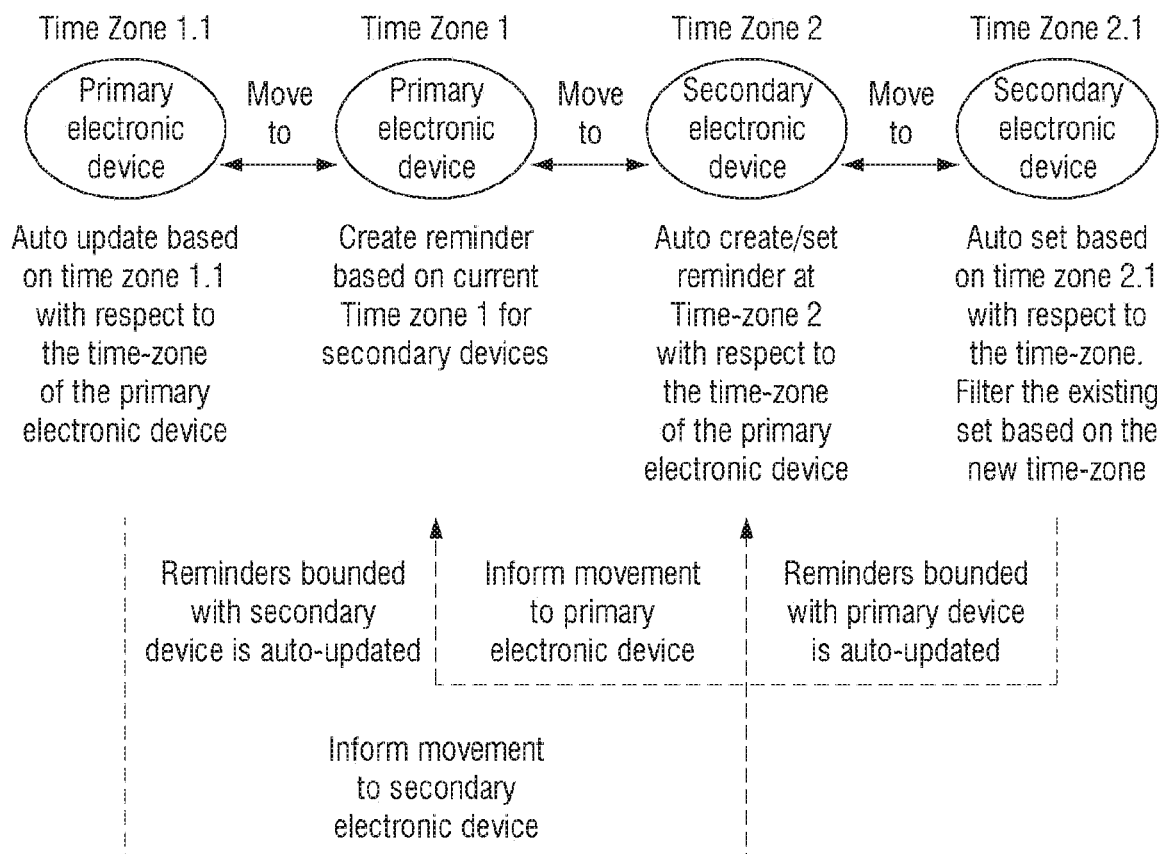

FIGS. 2A to 2C are example scenarios in which the time-interval of the event associated with the primary electronic device 100 and the secondary electronic device 200 is updated based on the time-zone difference, according to an embodiment of the disclosure.

Referring to FIG. 2A, the primary electronic device 100 can be configured to create an event i.e., birthday event and reminders associated with the birthday event for the secondary electronic device 200 based on the first time interval. By virtue of the proposed method, the secondary electronic device 200 (located at the second time interval) linked with the primary electronic device 100 is configured to automatically update the reminder of the birthday event based on the time-zone difference between the primary electronic device 100 and the secondary electronic device 200. The calendar application is merely used as an example to describe the features of the proposed method, the other applications associated with a capability of configuring the reminders can be used herein.

Referring to FIGS. 2B and 2C, similar to FIG. 2A, consider a scenario in which the primary electronic device 100 after creating the event for the secondary electronic device 200 moves to a different location associated with a different time-zone. Thus, the time-interval detector 140 upon detecting the change in time-interval, updates the event database 156 comprising the set of reminders associated with the calendar application of the primary electronic device 100. Thus, the updated information about the event i.e., reminders is then communicated with the second electronic device 100 which thereby allows the secondary electronic device 200 to auto create/set reminder with respect to the updated time-interval of the primary electronic device 100.

Figure 3:
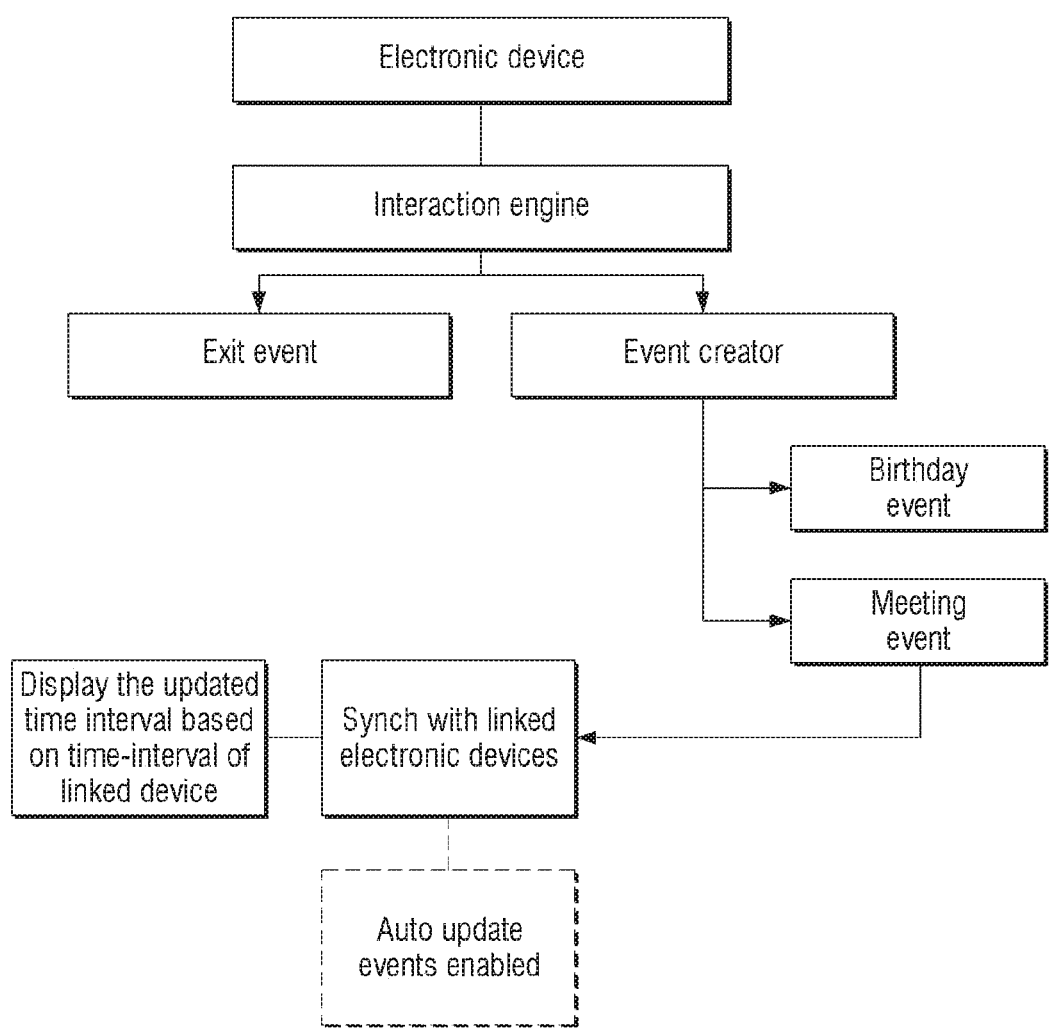
FIG. 3 is an example of various options provided to the user the electronic device for creating the event and linking with another electronic device, according to an embodiment of the disclosure.

FIG. 3 is an example of various options provided to the user for creating the event for the electronic device 100 and link with another electronic device 200, according to an embodiment of the disclosure. In an embodiment, the linking of the event can be automatic.

Referring to FIG. 3, the user of the electronic device 100 can therefore create the event i.e., birthday event, meeting event, etc., using the event creator accessible via interaction engine 130. Thereupon, the electronic device 100 can be configured to display the feature/option i.e., "sync the event with linked electronic device 200", if the options is found to be disabled. In response to detecting that the option to sync with linked electronic device 200 is enabled, then the electronic device 100 can be configured to dynamically receive the time-based information (location, tine-zone, or the like) associated with the linked electronic device 200. Thus, based on the change in time-based information of the electronic device 200, the electronic device 100 can be configured to display the updated time-interval determined by computing the difference between the time-zone associated with the time-interval of the electronic device 100 and the time-zone associated with the time-interval of the electronic device 200.

Figure 4:
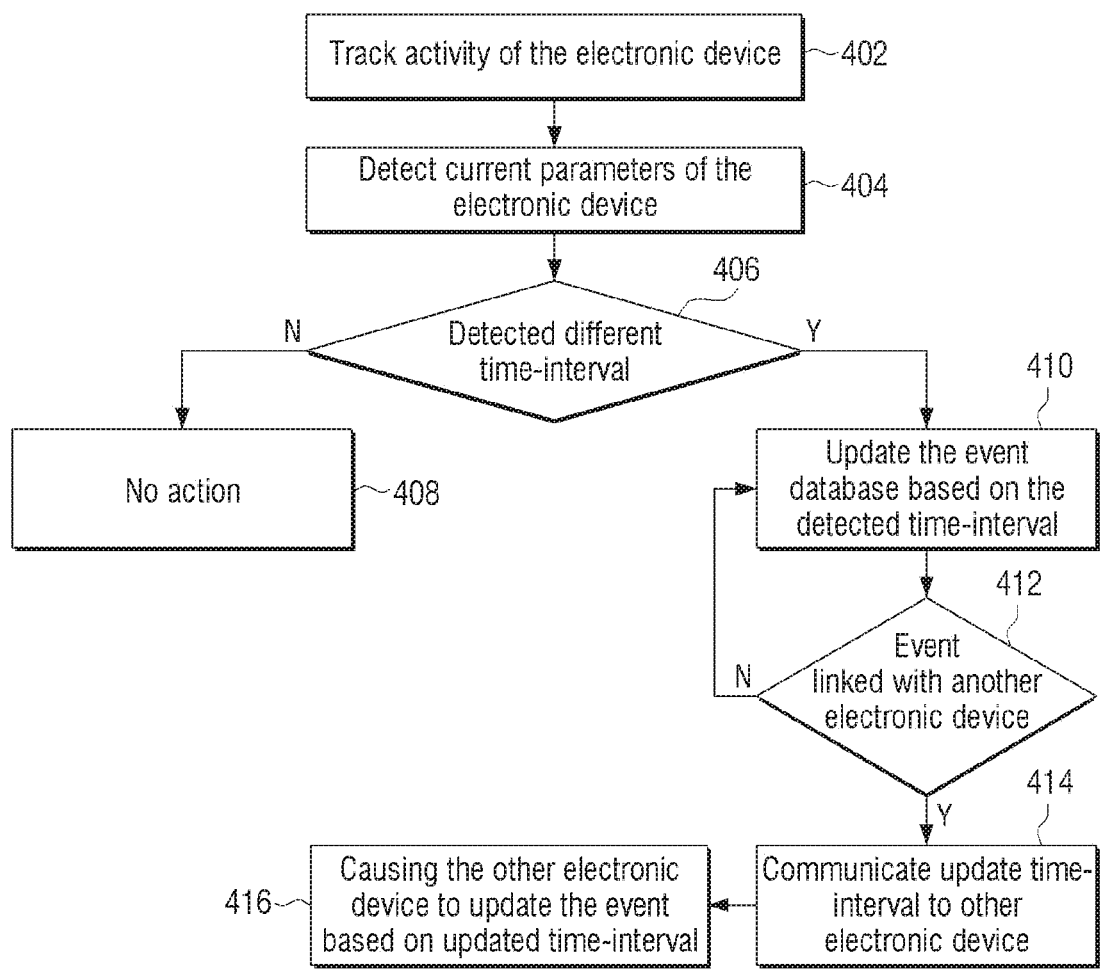
FIG. 4 is a flow diagram illustrating a method for managing events based on time-zone difference, according to an embodiment of the disclosure.

FIG. 4 is a flow diagram illustrating a method for managing events based on time-zone difference, according to an embodiment of the disclosure.

Referring to FIG. 4, at operation 402 the method includes tracking activities of the electronic device 100. In an embodiment, the method allows the time-interval detector 140 to track activities of the electronic device 100. The activities such as for example, location, time-interval, location and time-interval of linked electronic device 200, location and time-interval associated with events and reminders, and the like. Further, at operation 404, the method includes detecting current parameters of the electronic device 100. The current parameters such as for example, current location, current time-interval, current location and time-interval of linked electronic device 200, current location and time-interval associated with events and reminders, and the like. In an embodiment, the method allows the time-interval detector 140 and the event management system 150 to detect the current parameters of the electronic device 100.

Further, at operation 406, the method includes determining whether different time-interval with respect to the electronic device 100 and another electronic device 200 is detected. In an embodiment, the method allows the time-interval detector 140 and the event management system 150 determine whether different time-interval with respect to the electronic device 100 and another electronic device 200 is detected.

If, at operation 406, the time-interval detector 140 and the event management system 150 detects no change in the time-interval with respect to the electronic device 100 and another electronic device 200, then, at operation 408, no action is taken. If, at operation 406, the time-interval detector 140 and the event management system 150 detects different time-interval with respect to the electronic device 100 and another electronic device 200, then, at operation 410, the method includes updating the event in the event database 156 based on the detected time-interval (i.e., updated time interval determined as described above).

Further, at operation 412, the method includes determining whether the event is linked with another electronic device 200. If, at operation 412, the event management system 150 determines that the event is linked with another electronic device 200, then at operation 414, the method includes communicating the updated time-interval parameters (e.g., reminders) to other electronic device 200. Further, at operation 416, the method includes causing the other electronic device 200 to update the event based on updated time-interval. If at operation 412, the event management system 150 determines that the event is not linked with another electronic device 200 (not the bound event) then event management system 150 update the event database 156 as described at operation 410.

Figure 5:
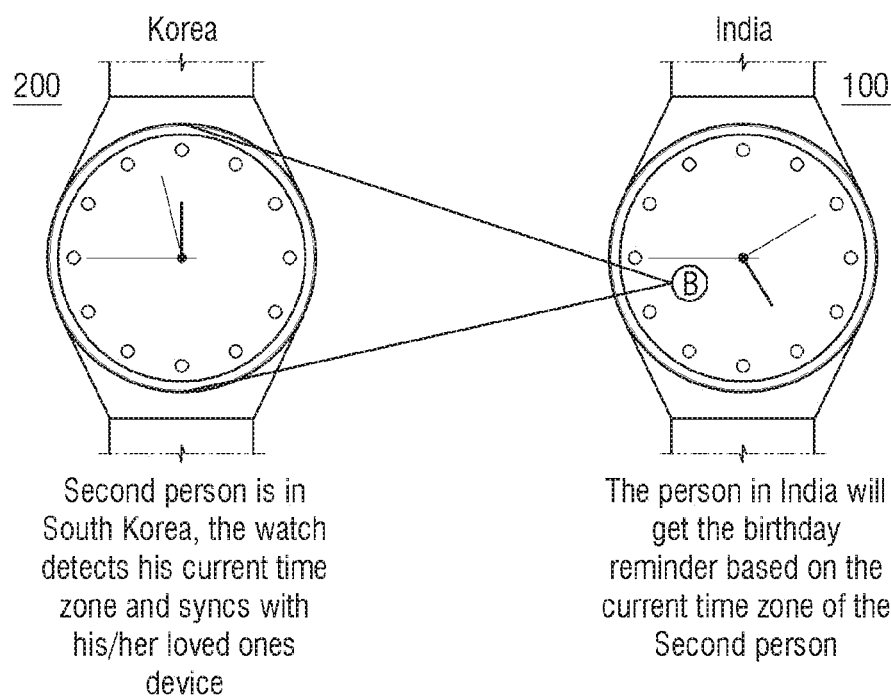
FIG. 5 is an example illustration in which a time-bounded event is displayed on the primary electronic device and the primary electronic device, according to various embodiments of the disclosure.

FIG. 5 is an example scenario illustrating a time-bounded event associated with the primary electronic device 100 and the secondary electronic device 200, according to various embodiments of the disclosure.

Referring to FIG. 5, the primary electronic device 100 is considered to be as the wearable device that displays a graphical user interface mimicking a clock. The graphical user interface is displayed on the display 120. The graphical user interface can include graphical elements such as but not limited to a blinking icon, indicia representing the event and the like. The graphical element is indicative of a reminder for the event. The graphical element is located at a point of the clock representing the time at which the event is set. The time is further associated with the first time interval corresponding to the first time zone. The event detection engine 152 detects the event created by the user.

In the example scenario, the event pertains to the birthday reminder created by the user of the primary electronic device 100. The parsing engine 154 parses the information of the event detected by the event detection engine 152. The parsed information includes information pertaining to the reminder such as details regarding the birthday, a contact that may have to be called and the time at which the contact may have to be called, location of the primary electronic device 100, etc. The event database 156 stores the parsed information. If the birthday event is created and the reminder is set at 8:30 PM, then the event management system 150 can create the graphical element indicating the birthday event and display the graphical element on the display 120. The graphical element is displayed at a point between the 8th hour and 9th hour on the graphical user interface.

The time-interval detector 140 monitors the time associated with the clock of the primary electronic device 100. In response to detecting the change in time-interval based on change detected in any one of the aforementioned time-interval parameters, the time-interval detector 140 communicates with the event management system 150. Accordingly, the parsed information is modified to reflect the change in time-interval.

As the primary electronic device 100 is synced with the secondary electronic device 200 and the event, i.e., the birthday event is bound event, hence the birthday reminder created using the primary electronic device 100 is also displayed on the secondary electronic device 200. The secondary electronic device 200 can be located in the second time zone different from the primary electronic device 100. The secondary electronic device 200 can be another wearable device similar to the primary electronic device 100. The time interval detector 140 detects the time zone in which the secondary electronic device 200 is located. Accordingly, the birthday reminder created using the primary electronic device 100 is displayed on the secondary electronic device 200 at the time that is appropriate for the time zone in which the secondary electronic device is located. For example, if the birthday reminder is set at 8:30 PM in India and the secondary electronic device 200 is in South Korea, the reminder is displayed on the display screen of the secondary electronic device 200 at 12 AM local time.

Figure 6:
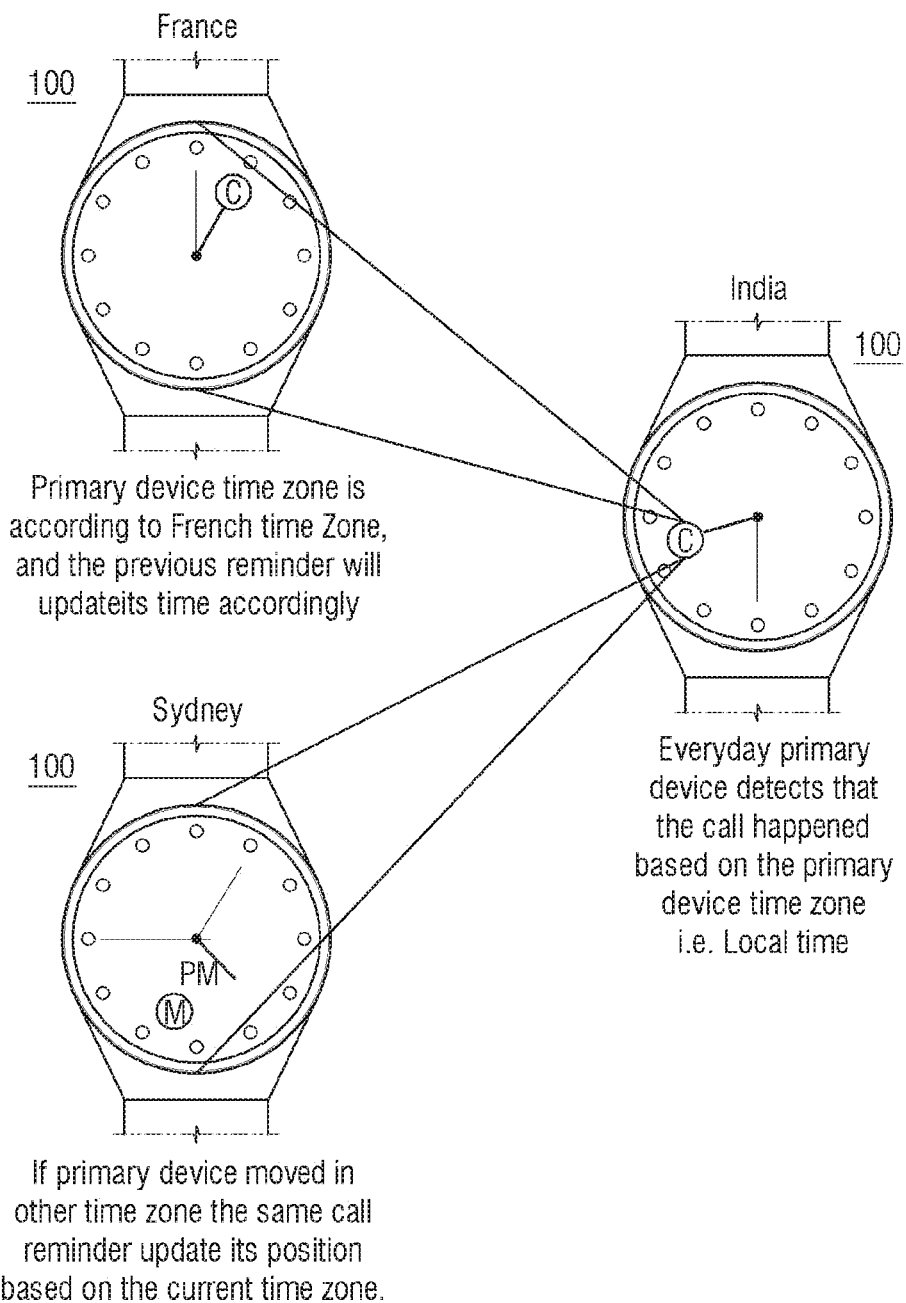
FIG. 6 is an example illustration in which an event such as reminder to call a contact is displayed on the primary electronic device and the secondary electronic device, according to various embodiments of the disclosure.

FIG. 6 is an example illustration in which an event such as reminder to call a contact is displayed on the primary electronic device 100 and the secondary electronic device 200, according to various embodiments of the disclosure.

Referring to FIG. 6, the primary electronic device 100 is similar to the wearable device described and shown in the example scenario of FIG. 5. The user of the primary electronic device 100 sets a reminder to call a contact at 8:30 PM Indian time. The same event shall also be created for the secondary electronic device 200. When the user travels to another time zone, such as France, the set reminder in both the primary electronic device 100 and the secondary electronic device 200 automatically updated in accordance with the French time zone such that the reminder to call the contact is displayed at 1:30 PM France time. The reminder is updated based on the change in time interval as detected by the time-interval detector 140 of the primary electronic device 100.

Similarly, if the secondary electronic device 200 is moved to a different location which constitutes different time-interval other than the time-interval of the primary electronic device 100, then accordingly, the reminder of the event at the primary electronic device 100 is also updated based on time-zone difference between the time-interval of the primary electronic device 100 and the time-interval of the secondary electronic device 200.

Figure 7:
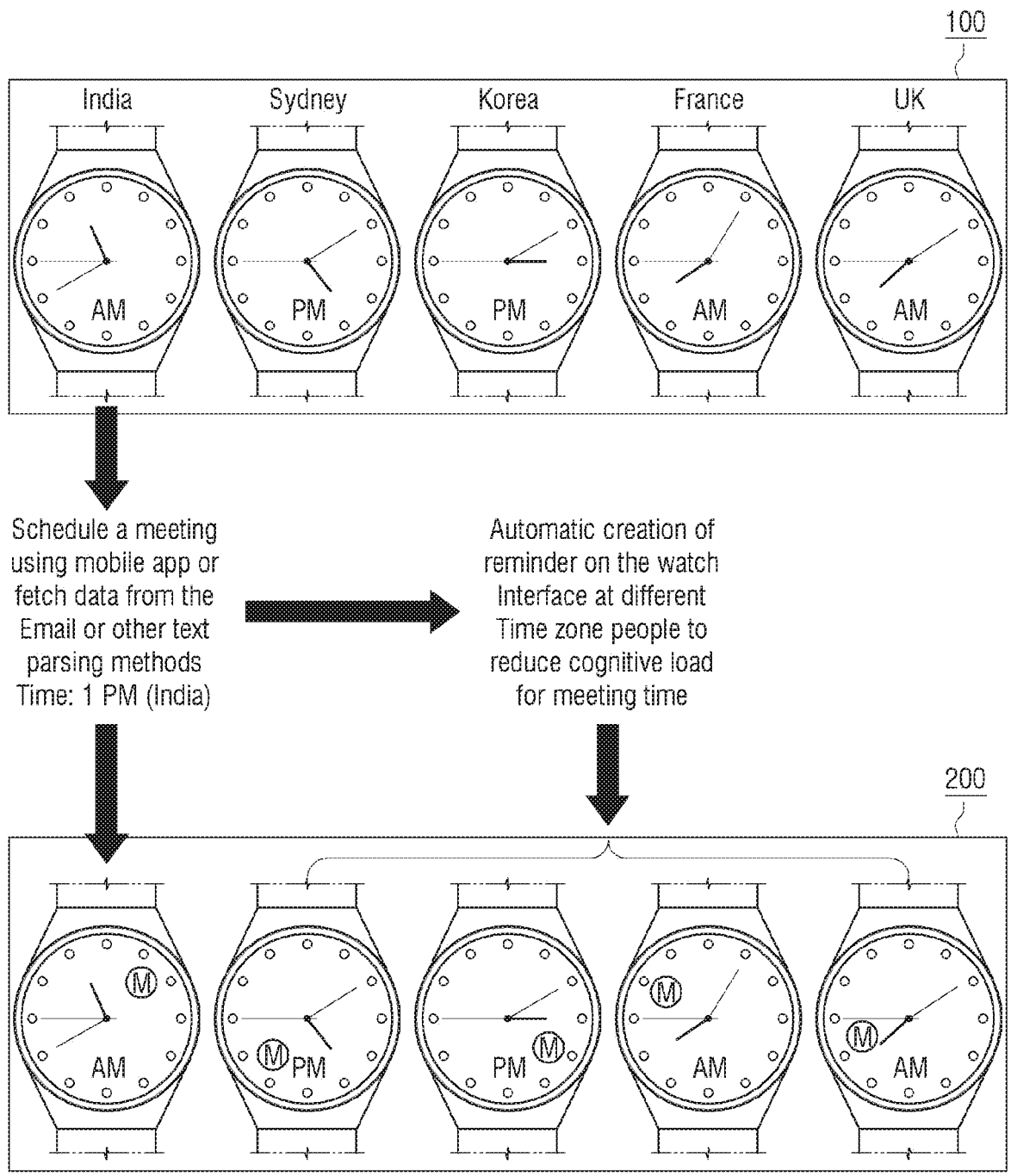
FIG. 7 is an example illustration in which a different time-zone meeting schedule is updated, according to an embodiment of the disclosure.

FIG. 7 illustrates an example scenario of different time-zone meeting schedule is updated, according to an embodiment of the disclosure.

Referring to FIG. 7, the primary electronic device 100 and the secondary electronic device 200 are similar to the wearable devices described and shown in the example scenario of the FIGS. 5 and 6. The user schedules a meeting at 1 PM Indian time on the primary electronic device 100. This event is communicated using the communication circuit 110 (shown in FIG. 1) to the synced secondary electronic device 200 that may be located in other time zones such as Australia, South Korea, France and the United Kingdom (UK). The time-interval detector 140 detects the change in time-interval in accordance with the time zone in which the secondary electronic device 200 is located. The event communicated to the secondary electronic device 200 is scheduled on the time appropriate to the time zone of the secondary electronic device 200. For example, the meeting scheduled at 1 PM Indian time is communicated to the secondary electronic device 200 in France to be scheduled at 8:30 AM French time. The event is scheduled on the secondary electronic device 200 in South Korea at 4:30 AM South Korean time while the event is scheduled at 7:30 AM UK time on the secondary electronic device 200 located in the UK time zone.

Figure 8A:
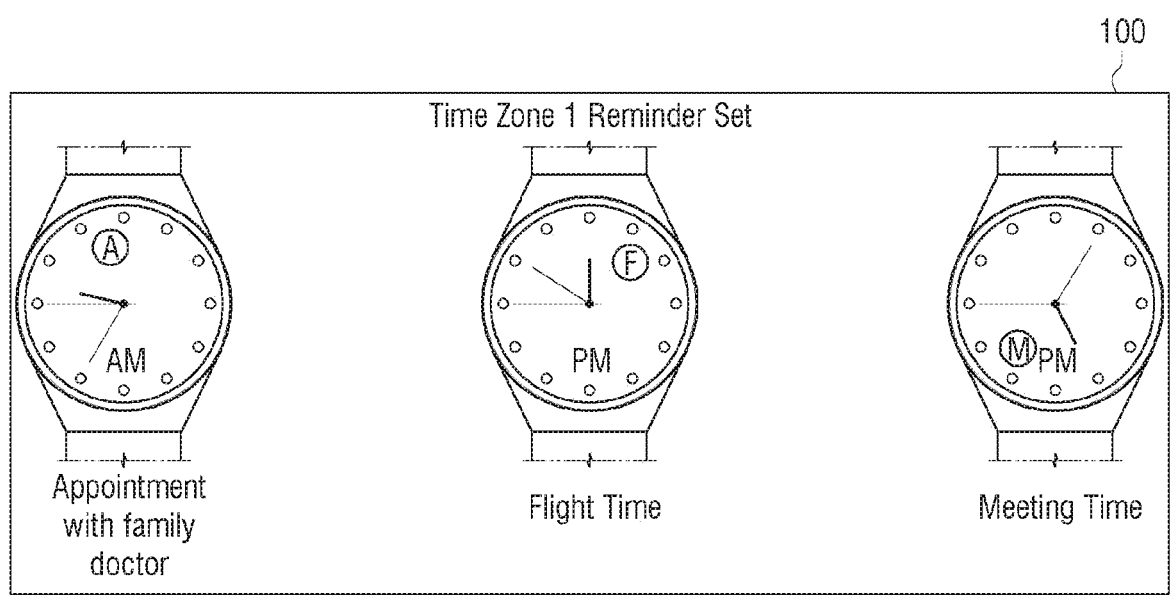
FIGS. 8A and 8B are example illustrations in which the reminders for the upcoming task events in order of priority are updated, according to an embodiment of the disclosure.
Figure 8B:
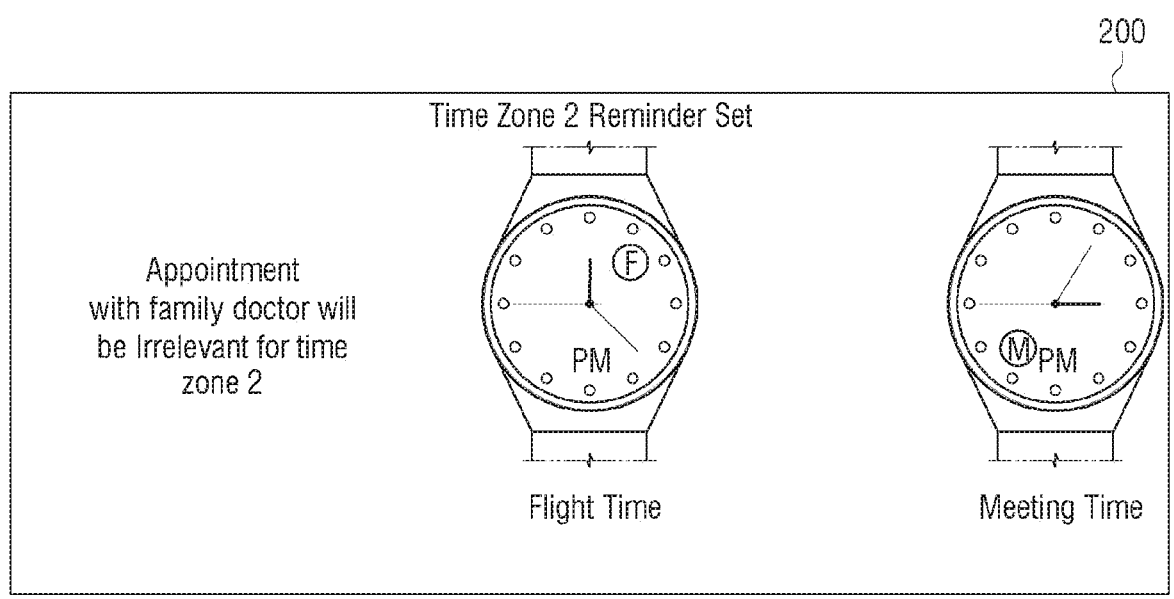

FIGS. 8A and 8B are example illustrations in which the reminders for the upcoming task events in order of priority are updated, according to an embodiment of the disclosure. The primary electronic device 100 and the secondary electronic device 200 are similar to the wearable devices described and shown in the example scenario of FIGS. 5, 6, and 7.

Referring to FIG. 8A, the events for an appointment with a family doctor, a reminder to catch a flight, a reminder for a meeting are displayed in order of the earliest scheduled event. In some embodiments, if the reminder relating to the flight time is prioritized by the user over the other events, the reminder relating to the flight time can be displayed before the other scheduled events. In other embodiments, if two events are scheduled at the same time, the event with higher priority is displayed first. In this regard, the priority may be a priority related to an event. For example, in a case in which a flight-related schedule has a higher priority than a meeting-related event, the electronic device 100 may display a reminder related to a flight time first and then, display a reminder related to a meeting time. According to another example embodiment, a priority may be determined according to a time at which an event occurs. For example, the electronic device 100 may set an event occurring first to have a higher priority.

FIG. 8B illustrates the example scenario according to an embodiment disclosed herein in which the user is in a different time zone than the one in which the events are created. Accordingly, the scheduled events are displayed at the equivalent times of the time zone in which the user is located. The event for the appointment with the family doctor is not displayed as it may be irrelevant to the time zone in which the user is located.

FIG. 9 is example illustration in which the user can set a range of time to be a time period for no activity/free time on the primary electronic device 100, according to an embodiment of the disclosure.

Referring to FIG. 9, the primary electronic device 100 and the secondary electronic device 200 are similar to the wearable devices described and shown in the example scenario of FIGS. 5, 6, 7, 8A, and 8B. The primary electronic device 100 can have a dial or a circular touch screen with a user interface mimicking a clock. Accordingly, the user can set a range of time, such as a time period between 10 AM and 4 PM to be a period of inactivity. The user can set a time by interacting with the bezel of the user interface that mimics the dial of the clock. This is synced with the secondary electronic device 200 through the network 300. If the secondary electronic device 200 is in a different time zone, accordingly, the change in time period is reflected on the secondary electronic device 200. The user of the secondary electronic device 200 can create a common event for the user of the primary electronic device 100 and the user of the secondary electronic device 200 in the set time period of inactivity.

For example, in a case in which the primary electronic device 100 sets a period of 10 PM to 4 AM as an inactive period 910, the second electronic apparatus 200 may set an inactive period 920 of the second electronic apparatus 200 corresponding to the inactive period 910 of the first electronic device 100. In this regard, the inactive period 920 may be a period of 4 AM to 10 PM as illustrated in FIG. 9. In this regard, in a case in which a schedule is present in the inactive period, the second electronic apparatus 200 may display a message informing that the corresponding schedule is a schedule during the inactive period of the first electronic device 100.

Figure 10:
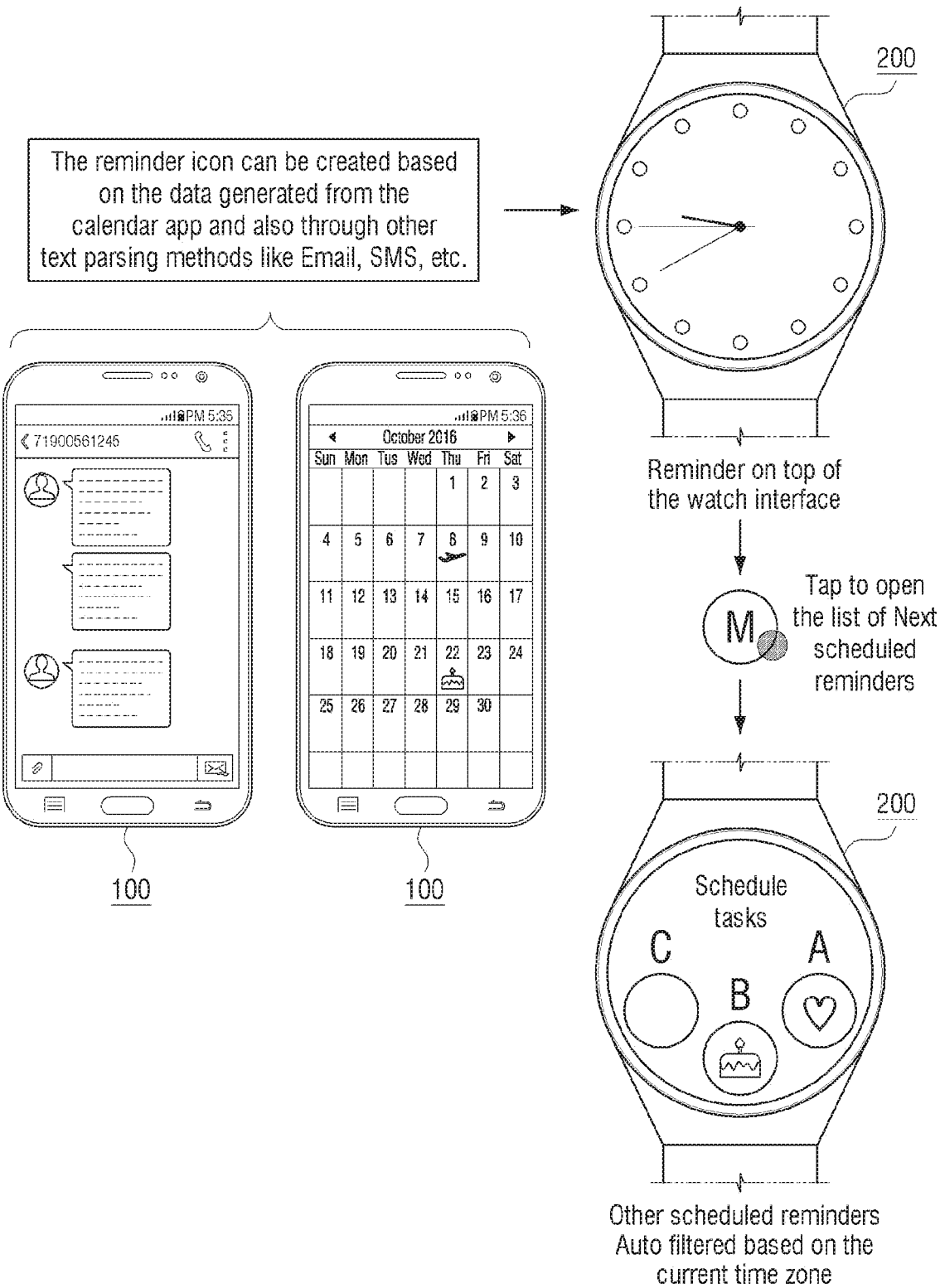
FIG. 10 is an example illustration in which the reminders parsed by the parsing engine are displayed on the display screen of the secondary electronic device, according to an embodiment of the disclosure.

FIG. 10 is an example illustration in which the reminders parsed by the parsing engine are displayed on the display screen of the secondary electronic device 200, according to an embodiment of the disclosure.

Referring to FIG. 10, the events can be created from data or information parsed by the parsing engine 154 from data received by the primary electronic device 100 such as but not limited to a text message, electronic mail (email) and the like. The data generated from a calendar application on the primary electronic device 100 can also be parsed to create or update the corresponding event. For example, the user may use the calendar application create a reminder for a birthday. The parsing engine 154 parses the data for the reminder from the calendar application and stores the parsed information in the event database 156. The communication circuit 110 communicates the parsed information to the secondary electronic device 200 through the network 300. The secondary electronic device 200 can be a wearable device similar to the wearable device as described in FIGS. 5, 6, 7, 8A and 8B. The reminder is represented as the graphical element on the clock interface of the secondary electronic device. When the user taps the graphical element, a list of scheduled events and/or reminders may be displayed on the display screen of the secondary electronic device 200.

Figure 11:
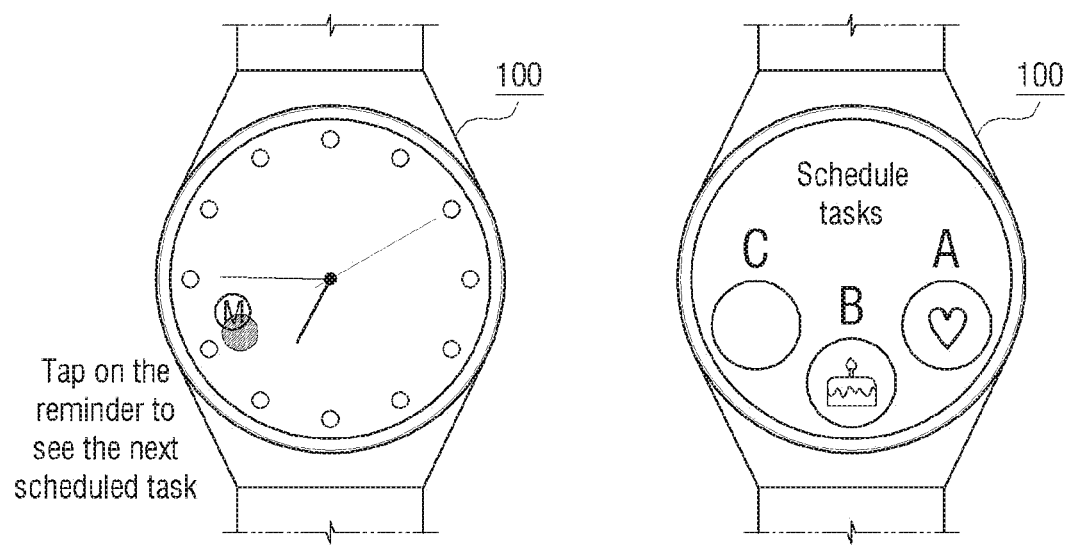
FIG. 11 is an example illustration in which the primary electronic device causes to display upcoming reminders or events based on the input, according to various embodiments of the disclosure.

FIG. 11 is an example illustration in which the primary electronic device 100 causes to display upcoming reminders or events based on the input (taping gesture), according to various embodiments of the disclosure.

Referring to FIG. 11, the upcoming reminders or events are represented by respective graphical elements placed at the corresponding time slot as shown in FIG. 11. As shown in FIGS. 5, 6, 7, 8A and 8B, the primary electronic device 100 can be the wearable device with the graphical user interface mimicking a clock.

FIG. 12 is an example illustration in which the primary electronic device displays a graphical element indicating the type of event, according to various embodiments of the disclosure.

Referring to FIG. 12, the primary electronic device 100 with the graphical user interface mimicking a clock, similar to the graphical user interface described in connection with the example scenarios illustrated in FIGS. 5, 6, 7, 8A and 8B. The graphical element representing the event or the reminder can be any indicia that reflects the event or reminder. Based on the data parsed by the parsing engine 154, the graphical element is generated. For example, if the reminder is for a birthday or any other celebratory event, the graphical element displayed on the graphical user interface can be a balloon. In another example, if the reminder is for a call to be placed, the graphical element can be a call icon. The graphical element is displayed at the time slot associated with the event. When the time is in the vicinity of the time slot, such as within five minutes of the event occurring, the display 120 can glow brighter or can blink. When the event has happened, other graphical elements representative of the event can be generated. For example, as shown in FIG. 12, when a birthday event has happened, the display 120 can display several animated balloons. The graphical elements are generated can last for a pre-defined time period on the display 120 through the graphical user interface.

FIG. 13 is an example illustration in which bezel interaction is detected for displaying to-do-tasks, according to various embodiments of the disclosure.

Referring to FIG. 13, the primary electronic device 100 is the wearable device described in connection to the example scenarios illustrated in FIGS. 5, 6, 7, 8A, 8B and 12. The primary electronic device 100 displays a graphical element representative of a birthday reminder in FIG. 13. Upon tapping the graphical element and dragging the graphical element along the bezel, the display 120 displays other graphical elements associated with upcoming events at their corresponding time slots.

Figure 14A:
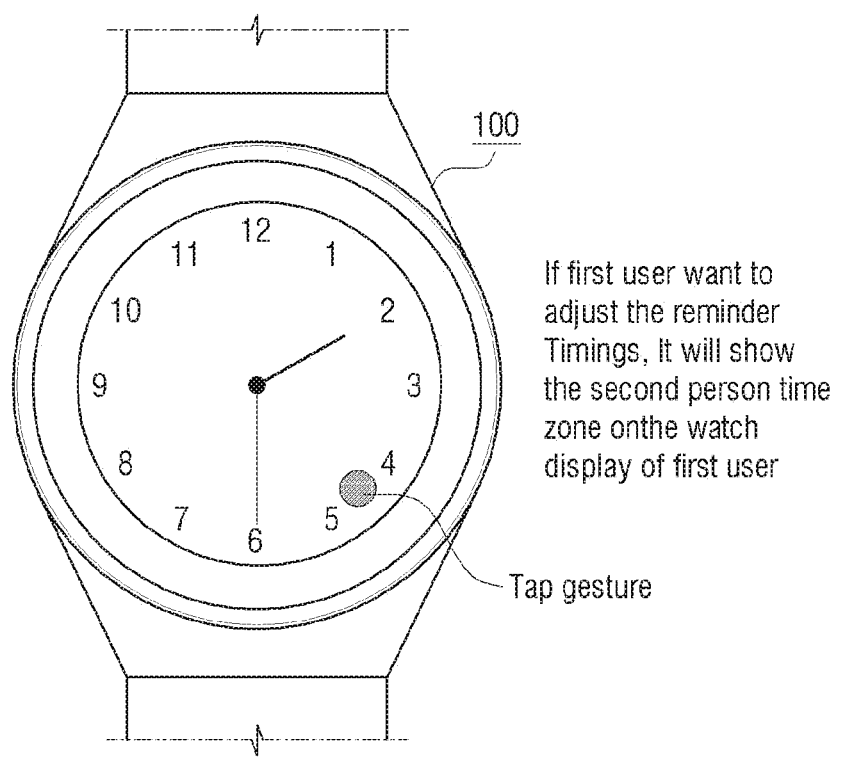
FIGS. 14A and 14B are example illustrations in which second time interval of the secondary electronic device is displayed on a display of the primary electronic device while adjusting the reminder, according to various embodiments of the disclosure.
Figure 14B:
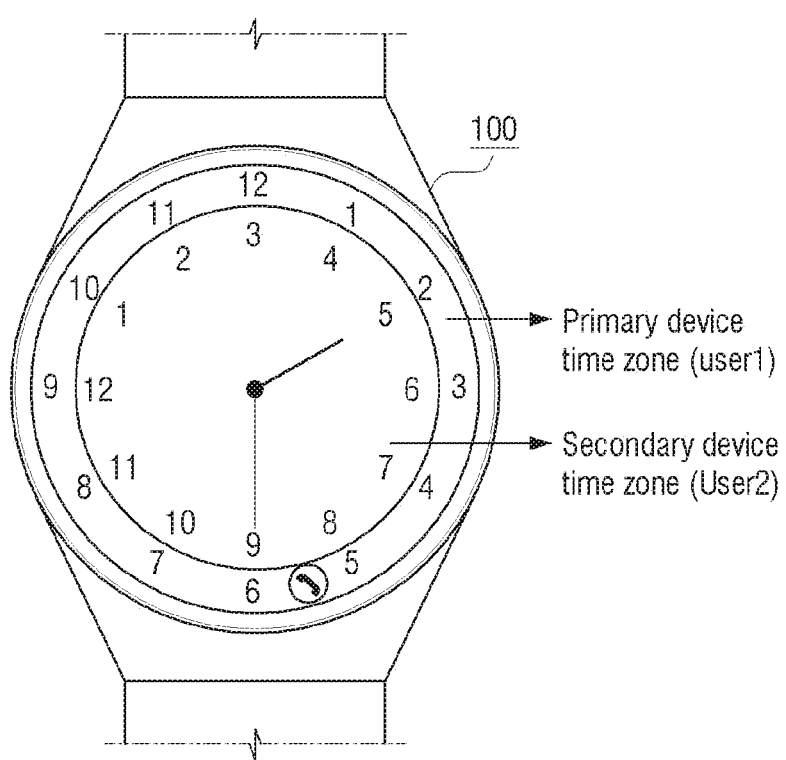

FIGS. 14A and 14B are example illustrations in which second time interval of the secondary electronic device 200 is displayed on the display 120 of the primary electronic device 100 while adjusting the reminder, according to various embodiments of the disclosure.

Referring to FIGS. 14A and 14B, the primary electronic device 100 and the secondary electronic device 200 are the wearable device, similar to the wearable device described in connection with the example scenarios illustrated in FIGS. 5, 6, 7, 8A, 8B and 12. The user can adjust the reminder timings using the bezel of the dial. The interaction engine 130 senses a touch gesture of the user around the bezel of the display screen. As the reminder timings are adjusted by the user, the corresponding time pertaining to the secondary electronic device 200 synced to the primary electronic device 100 is displayed on the display screen of the primary electronic device. The user operating the secondary electronic device 200 may be in another time zone. The time corresponding to the other time zone is displayed. Any change made in the reminder time for the primary electronic device 100 is automatically synced with the secondary electronic device 200. The change in the reminder timings for the secondary electronic device 200 is also displayed, as shown in FIG. 13, on the display screen of the primary electronic device 100.

FIG. 14B illustrates the example scenario of FIG. 14A from the perspective of the secondary electronic device 200. When the user of the primary electronic device 100 adjusts the reminder timings, the action of adjusting the reminder timings is displayed on the secondary electronic device 200 as shown in FIG. 14B. The corresponding graphical user of interface of the primary electronic device 100 is displayed as an inner dial or as a clock within the clock interface of the secondary electronic device 200. Changes made by the user of the primary electronic device 100 are automatically displayed on the secondary electronic device 200.

Figure 15:
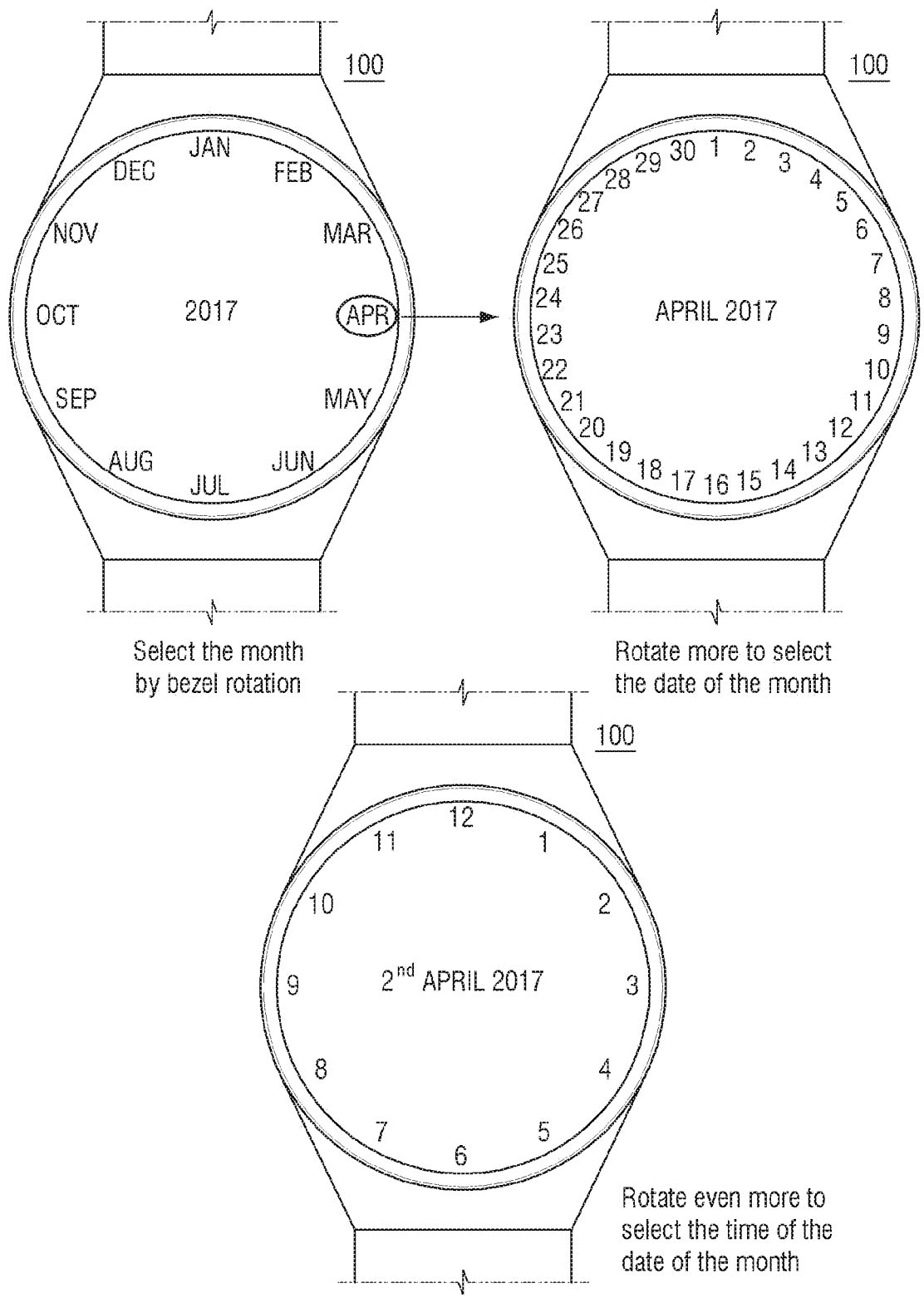
FIG. 15 is an example illustration of the graphical user interface of the primary electronic device for adjusting the reminders, according to various embodiments of the disclosure.

FIG. 15 is an example illustration of the graphical user interface of the primary electronic device 100 for adjusting the reminders, according to various embodiments of the disclosure.

Referring to FIG. 15, the primary electronic device 100 is the wearable device described in connection with the example scenarios illustrated in FIGS. 5, 6, 7, 8A, 8B, 9, 11, 12, 13, 14A and 14B. By bezel rotation the user can adjust the reminder timings pertaining to the event. The user can select the month, the date and the time using the graphical user interface displayed on the primary electronic device 100.

Figure 16:
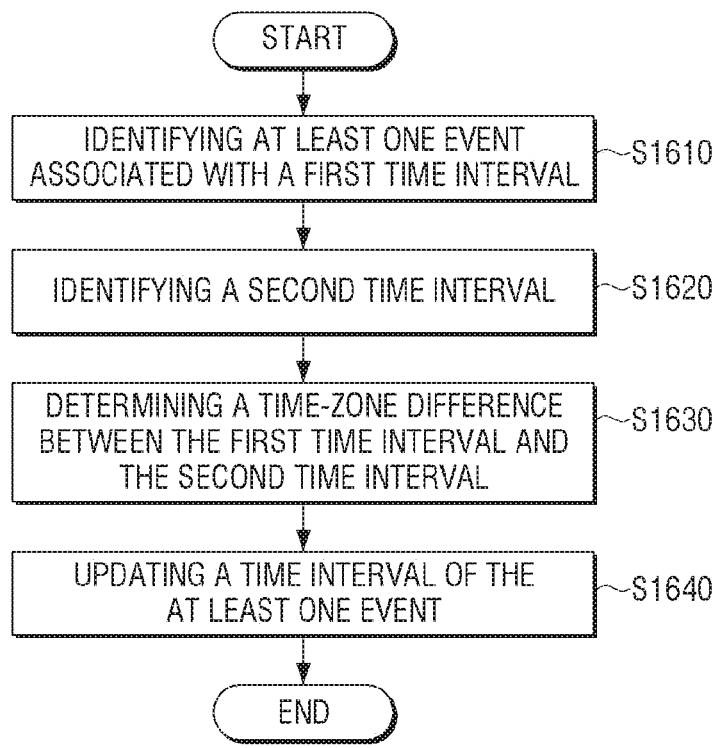
FIG. 16 is a flowchart illustrating an event management method, according to an embodiment of the disclosure.

FIG. 16 is a flowchart illustrating an event management method, according to an embodiment of the disclosure.

Referring to FIG. 16, the primary electronic device 100 may identify at least one event related to at least one from among the primary electronic device 100 and the secondary electronic device 200, at operation S1610. In this regard, the at least one event may be an event related to a first time interval.

The primary electronic device 100 may identify a second time interval associated with at least one from among the primary electronic device 100 and the secondary electronic device 200, at operation S1620. For example, in a case in which the at least one event acquired by the primary electronic device 100 is an event associated with the primary electronic device 100.

The primary electronic device 100 may identify a second time interval associated with the secondary electronic device 200. Alternatively, in a case in which the at least one event identified by the primary electronic device 100 is an event associated with the secondary electronic device 200, the primary electronic device 100 may identify a second time interval associated with the secondary electronic device 200.

The primary electronic device 100 may determine a time-zone difference between the first time interval and the second time interval based on at least one time-zone parameter associated with the first time interval and the second time interval, at operation 51630.

The primary electronic device 100 may update a time interval of at least one event acquired at operation S1640 based on the identified time-zone difference.

The various embodiments disclosed herein can be implemented through at least one software program running on at least one hardware device and performing network management functions to control the elements. The elements shown in FIGS. 1 through 16 include blocks which can be at least one of a hardware device, or a combination of hardware device and software module.

The foregoing description of the specific various embodiments will so fully reveal the general nature of the various embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for automatically managing events based on a time-zone difference, the method comprising:
   identifying, by a primary electronic device, at least one event associated with the primary electronic device, wherein the at least one event is associated with a first time interval;
   identifying, by the primary electronic device, a second time interval;
   determining, by the primary electronic device, a time-zone difference between the first time interval and the second time interval based on at least one time-zone parameter associated with the first time interval and the second time interval;
   updating, by the primary electronic device, a time interval associated with the at least one event at the primary electronic device and a secondary electronic device based on the time-zone difference;
   identifying, by the primary electronic device, a third time interval based on the updated time interval, wherein the third time interval indicates time availability;
   transmitting, by the primary electronic device, an indication of the third time interval to the secondary electronic device;
   determining by the primary electronic device, a conflict among two or more events based on the updated time interval; and
   performing, by the primary electronic device, at least one of providing a notification to select the at least one event from the two or more events or selecting the at least one event from the two or more events based on priority of the at least one event from the two or more events,
   wherein the time interval associated with the at least one event is different than the updated time interval associated with the at least one event.

2. The method of claim 1, further comprising:
   updating, by the primary electronic device, at least one reminder of the at least one event based on the updated time interval.

3. The method of claim 1, wherein the identifying of the second time interval comprises receiving information indicative of a change in time-zone from the first time interval to the second time interval.

4. The method of claim 1, wherein the at least one time-zone parameter comprises at least one of a mobile country code, a Greenwich Mean Time (GMT) offset, a daylight savings time parameter, or geo-location parameters comprising a global positioning system identifier.

5. The method of claim 1, further comprising:
   managing, by the primary electronic device, the at least one event based on the updated time interval.

6. The method of claim 5, wherein the managing of the at least one event based on the updated time interval comprises displaying an indication about the at least one event in accordance with the updated time interval on a display screen of the primary electronic device and the secondary electronic device.

7. The method of claim 6, wherein the indication is a graphical element indicating a type of the at least one event.

8. The method of claim 5, wherein the managing of the at least one event based on the updated time interval comprises:
   determining a conflict among two or more events based on the updated time interval; and
   performing one of:
      generating a notification to select the at least one event from the two or more events, or
      selecting the at least one event from the two or more events based on priority of the at least one event from the two or more events.

9. The method of claim 1, wherein the at least one event comprises at least one of a meeting, a conference, a birthday, or an activity.

10. An electronic device for managing events based on time-zone difference, the electronic device comprising:
    a communication circuit;
    a memory configured to store instructions; and
    at least one processor operatively coupled with the communication circuit and the memory,
    wherein the least one processor, when executing the instructions, is configured to:
       identify at least one event associated with the electronic device, wherein the at least one event is associated with a first time interval,
       identify a second time interval,
       determine a time-zone difference between the first time interval and the second time interval based on at least one time-zone parameter associated with the first time interval and the second time interval,
       update a time interval associated with the at least one event at the electronic device and another electronic device based on the time-zone difference,
       identify a third time interval based on the updated time interval, wherein the third time interval indicates time availability,
       control the communication circuit to transmit an indication of the third time interval to the other electronic device,
       determine a conflict among two or more events based on the updated time interval, and
       perform at least one of providing a notification to select the at least one event from the two or more events or selecting the at least one event from the two or more events based on priority of the at least one event from the two or more events, and
    wherein the time interval associated with the at least one event is different than the updated time interval associated with the at least one event.

11. The electronic device of claim 10, wherein the at least one processor, when executing the instructions, is further configured to update at least one reminder of the at least one event based on the updated time interval.

12. The electronic device of claim 10, wherein, when identifying the second time interval, the at least one processor, when executing the instructions, is further configured to control to receive information indicative of a change in time-zone from the first time interval to the second time interval.

13. The electronic device of claim 10, wherein the at least one time-zone parameter comprises at least one of a mobile country code, a Greenwich Mean Time (GMT) offset, a daylight savings time parameter, or geo-location parameters comprising a global positioning system identifier.

14. The electronic device of claim 10, wherein the at least one processor, when executing the instructions, is further configured to manage the at least one event based on an updated time interval.

15. The electronic device of claim 14, wherein, when managing the at least one event based on the updated time interval, the at least one processor, when executing the instructions, is further configured to control to display an indication about the at least one event in accordance with the updated time interval on a display screen of the electronic device and the other electronic device.

16. The electronic device of claim 15, wherein the indication is a graphical element indicating a type of the at least one event.

17. The electronic device of claim 14, wherein, when managing the at least one event based on the updated time interval, the at least one processor, when executing the instructions, is further configured to:
   determine a conflict among two or more events based on the updated time interval; and
   perform one of:
      generating a notification to select the at least one event from the two or more events, or
      selecting the at least one event from the two or more events based on priority of the at least one event from the two or more events.

18. The electronic device of claim 10, wherein the at least one event comprises at least one of a meeting, a conference, a birthday, or an activity.

\* \* \* \* \*